United States Patent Office 3,524,759
Patented Aug. 18, 1970

3,524,759
PROCESS FOR CURTAIN COATING ARTICLES WITH A MOLTEN COMPOSITION
Richard L. McConnell and Doyle A. Weemes, Kingsport, Tenn., assignors to Eastman Kodak Company, Rochester, N.Y., a corporation of New Jersey
No Drawing. Filed June 26, 1967, Ser. No. 648,950
Int. Cl. B44d 1/09; B32b 27/10
U.S. Cl. 117—105.3
3 Claims

ABSTRACT OF THE DISCLOSURE

A process of coating an article by a falling curtain of a hot melt coating composition comprising 40–99 percent by weight of a copolymer of ethylene and a comonomer from the group consisting of alkenyl alkanoates, alkyl acrylates, alkyl methacrylates, acrylic acid, and methacrylic acid; and 1–60 percent by weight of a crystallizable poly($\alpha$-olefin).

---

This invention relates to a hot melt coating composition and, more particularly, it relates to such a composition comprising a blend of an ethylene copolymer and a poly($\alpha$-olefin).

In the preparation of coated substrates, or the coating of articles whether they be mounted on substrates or not, the process of hot melt coating is highly advantageous. A particularly desirable process for applying such coatings is a curtain coating process in which a falling curtain of a molten, viscous, thermoplastic material is applied to a substrate or an article by passing that substrate or article through the falling curtain and, thereby, causing a coating to be applied to the upwardly facing surfaces of the substrate or the article. The ultimate use of the coated substrate or article as well as the process conditions for coating that substrate or article dictates that the thermoplastic coating composition have a particular set of properties. The final coating must be transparent, tough, strong, tear resistant, and economical. In the melt, this composition must be sufficiently viscous to form a continuous falling film without rupturing and must have sufficient heat stability to be maintained in a molten condition without degradation over processing times. Those materials known in the past that satisfy these conditions are the plasticized cellulose esters. Although cellulose esters are highly desirable curtain coating compositions they suffer from two weaknesses which cause cellulose esters be unacceptable as coating materials in certain end-use applications. Cellulose esters have relatively poor barrier properties, i.e., moisture and air diffuse to some extent through cellulose esters; and they also tend to adhere tooo tightly to certain substrates and articles. Unmodified polyethylene is known to have good barrier properties but this material is not suitable as a curtain coating resin because it tends to cross-link and to produce gel specks which cause the final coating to be commercially unacceptable. Ethylene copolymers, for several reasons have not been entirely suitable for a curtain coating process.

It has now been found, however, that blends of certain ethylene copolymers with certain polyolefins can be employed advantageously to provide a combination of properties which is admirably suited for the curtain coating process.

It is an object of this invention to provide an improved thermoplastic composition especially adapted for use in hot melt, curtain coating processes.

It is another object of this invention to provide a hot melt coating composition having an excellent barrier properties.

It is another object of this invention to provide a hot melt coating composition which is highly desirable for packing food materials.

It is another object of this invention to provide a hot melt coating composition which is partially based on polymeric $\alpha$-olefins and partially on vinyl or acrylic resins and which has a high degree of melt stability.

Still other objects will be apparent from the more detailed description of this invention which follows.

This invention provides a thermoplastic composition having a melt viscosity at 190° C. of 5,000 to 125,000 cp. comprising:

(1) 40 to 99 percent by weight of a copolymer of 55 to 99 percent by weight of ethylene and 1 to 45 percent of at least one comonomer selected from the group consisting of:

(a) alkenyl alkanoates wherein said alkenyl portion contains 2–4 carbon atoms and said alkanoate portion contains 2 to 6 carbon atoms,
(b) alkyl acrylates wherein said alkyl contains 1 to 8 carbon atoms,
(c) alkyl methacrylates wherein said alkyl contains 1 to 8 carbon atoms,
(d) acrylic acid,
(e) methacrylic acid, and (2) 1 to 60 percent by weight of a crystallizible polymer of an $\alpha$-olefin having 2 to 10 carbon atoms, said polymer having a melt viscosity at 190° C. of 1,000 to about 20,000 cp. when the polymer is polyethylene and a melt viscosity of 1,000 to about 400,000 cp. when the polymer is polypropylene or other higher polyolefin homo- or copolymer. In preferred embodiments of this invention, the melt viscosity of the coating composition is at least 15,000 cp. and the copolymer is ethylene/vinyl acetate. An especially desirable combination is a thermoplastic composition comprising about 80–95 percent of a copolymer of ethylene and vinyl acetate in which 70–85 percent by weight of the copolymer is derived from ethylene and the remaining 15–30 percent is derived from vinyl acetate.

The process of hot melt coating as employed in the description of this invention is intended to cover any process in which the coating composition is heated or otherwise formed into a molten, viscous mass; and while in that condition, is applied as a coating to a substrate or article and permitted to congeal in place. In one of such processes, the hot, molten composition is applied to a roller which in turn applies the molten composition to a flat substrate. Among the most versatile of such processes, however, is that which is known as the curtain coating process in which a hot metal is extruded from a narrow, slit-like orifice and permitted to fall vertically in the form of a molten, viscous curtain. A substrate, an article, or the combination of an article on a substrate is passed horizontally through the falling curtain causing the curtain to drape itself over the upwardly facing surfaces of the object to be coated. Alternatively, the molten curtain may be caused to move over the substrate, article or the combination of an article on a substrate which is held in a stationary position.

In certain instances, it may be advantageous to employ a vacuum to remove the air between the article or substrate, being coated and the coating itself. The vacuum helps to produce a coating which conforms closely to the outer contour of the article or substrate, as well as to remove oxygen and moisture which might otherwise corrode or be detrimental to the coated article or substrate. This feature of employing a vacuum is particularly advantageous when the coated object is either a porous substrate or a flat, porous substrate with an article mounted thereon. Under these conditions a vacuum applied to the underneath side of the porous substrate while it is being passed through the falling curtain of molten thermoplastic material causes the curtain to deposit snugly over the surface of the flat substrate and the upwardly facing surfaces of any article mounted on the substrate. A detailed description of a process employing such a vacuum may be found in copending application Serial No. 534,488, filed Mar. 15, 1966, by Rex Eells and John L. Cameron, now a Defensive Publication published on Dec. 3, 1968.

The coating composition of this invention advantageously has a melt viscosity at 190° C. of 5,000 to 125,000 cp., preferably at least 15,000 cp. and normally not greater than about 100,000 cp. The composition is essentially a blend of two types of components, one being an ethylene copolymer and the other being a poly(α-olefin).

The copolymer component of the blended thermoplastic composition of this invention is a copolymer of 55–99 percent by weight of ethylene and 1–45 percent by weight of any one or more of three types of esters and two types of acids. In preferred embodiments of this invention, the copolymer comprises 70–85 percent by weight of ethylene with the remaining 15–30 percent being derived from one or more of the other comonomers. The comonomer may be:

(a) an alkenyl alkanoate in which the alkenyl portion contains 2–4 carbon atoms and the alkanoate portion contains 2–6 carbon atoms.
(b) an alkyl acrylate wherein the alkyl portion contains 1–8 carbon atoms,
(c) an alkyl methacrylate wherein the alkyl group contains 1–8 carbon atoms,
(d) acrylic acid, or
(e) methacrylic acid.

The alkenyl alkanoates include esters such as vinyl, isopropenyl, butenyl, isobutenyl, and allyl esters of alkanoic acids having 2–6 carbon atoms. Suitable alkanoic acids include acetic, propionic, butyric, valeric, and caproic acids and their isomeric derivatives, such as, isobutyric, isovaleric, and isocaproic acids. Specific esters included among the alkenyl alkanoates are vinyl acetate, vinyl propionate, vinyl butyrate, vinyl valerate, vinyl caproate, isopropenyl acetate, butenyl acetate, isobutenyl acetate, isopropenyl butyrate, isopropenyl valerate, allyl acetate and the like.

The alkyl acrylates and methacrylates employed as a comonomer include those acrylates and methacrylates in which the alkyl group contains 1–8 carbon atoms and is n-alkyl, isoalkyl, or other branched chain alkyl. Among such alkyl acrylates and methacrylates are: methyl, ethyl, propyl, isopropyl, isobutyl, amyl, isoamyl, hexyl, 2-ethylhexyl, heptyl, and octyl acrylates and methacrylates.

The other component of the blended thermoplastic composition of this invention is a crystallizable polymer of a α-olefin containing 2–10 carbon atoms per molecule and the polymer has a molecular weight such that the melt viscosity of the polymer at 190° C. is from 1,000 to about 20,000 cp. when polyethylene is used and 1,000 to about 400,000 cp. when polypropylene or other higher α-olefin homo- or copolymer is used. Ethylene and propylene homo- or copolymers are the preferred polyolefins for this component of the composition although other α-olefin polymers such as those derived from 1-butene, 1-pentene, 1-hexene, 1-heptene, 1-octene, 1-nonene, and 1-decene are also contemplated. This component of the invention need not be a homopolymer but may be a copolymer such as, for example, a copolymer of ethylene and propylene, a copolymer of propylene and 1-butene, or a copolymer of ethylene and 1-butene, etc.

The proportions of the two components of the thermoplastic composition of this invention are such that 40–99 percent by weight of the final composition comprises the copolymer and 1–60 percent by weight of the final composition comprises the polymer of an α-olefin. It is preferred, however, that the copolymer comprise 80–95 percent by weight of the total composition with the polymer of the α-olefin comprising the remaining 5–20 percent by weight in order to provide the optimum combination of properties for most uses of the composition of this invention.

The coating composition of this invention may be used to coat substrates such as flat sheets, paper, cardboard, articles of any size, shape, or contour mounted on supporting substrates, such as toys mounted on a cardboard containing advertising or instruction for use of that toy, cosmetics mounted on a display support, and similar packages. It is, furthermore, contemplated that foods such as meat, fruit, vegetables, poultry, and the like may be packaged by encapsulation employing the coating composition of this invention by itself or in combination with a tray or other substrate to support the food. This coating composition forms a highly desirable encapsulation for dressed chickens or turkeys without the necessity of providing a supporting substrate.

Stabilizers normally added to protect the coating compositions during or after the coating operation against degradation by heat, light, or oxygen include dilauryl thiodipropionate (DLTDP), 2,6-ditertiary butyl-p-cresol (BHT), tris(nonylphenyl) phosphite (Polygard), dioctadecyl-p-cresol (DOPC), 4,4'-thiobis(6-tertiary butyl-m-cresol) (Santonox R), and the like, or various combinations of the compounds. Other phenolic or phosphite type stabilizers known to be effective for the stabilization of polyolefins may also be used in the stabilization of these compositions.

Although in most instances it will not be necessary nor appropriate to do so, the composition of this invention also contemplates the incorporation of such modifiers as pigments, fillers, decorative matter, and other constituents for modifying the composition.

This invention may be more readily understood by reference to the following illustrative examples in which parts and percentages are by weight and temperatures are in degrees centigrade unless otherwise specified. It is not intended that these examples shall limit the invention in any manner whatsoever.

EXAMPLE 1

A blend is prepared of 80 percent by weight of an ethylene/vinyl acetate copolymer and 20 percent by weight of a low viscosity polyethylene. The copolymer comprises 82 percent by weight ethylene and 18 percent by weight vinyl acetate and exhibits a melt viscosity at 190° C. of 58,000 cp. The polyethylene has a melt viscosity at 190° C. of 4,000 cp. The melt viscosity of the blend was 34,000 cp. at 190° C. Air-quenched films having a thickness of 5 mils are prepared with the assistance of a hot doctor blade on a flat casting surface. After the coating congeals, it is stripped from the surface and found to have the following properties:

Tensile modulus, p.s.i. _____ 6,000
Tensile yield strength, p.s.i. _____ 700
Tensile break strength, p.s.i. _____ 700
Elongation, percent _____ 454
Appearance—clear with slight haze.

EXAMPLE 2

The blend composition described in Example 1 is mixed with melt stabilizers and used to coat various articles. The mixture comprises 400 parts by weight of the blend of Example 1, 1.5 parts of dilauryl thiodipropionate, and 1.5 parts of BHT. This mixture is melt extruded into strands, quenched in water, and chopped into pellets to produce a homogeneous feed material for a curtain coating process. The pellets are melted and fed to the extrusion orifice of a curtain coating machine at a melt temperature of approximately 180° C. Toy automobiles mounted on porous paperboard are placed over a support beneath which a vacuum is applied. The falling curtain of molten material is moved across the above-described combination of toy automobiles, paperboard, and vacuum support causing the curtain to be deposited over the upwardly facing surfaces of the cars and the paperboard. Vacuum is then applied to draw the film down over the toys. The congealed coating is clear and not tacky, and the resulting package is considered to be excellent. The coating operation is repeated continuously for two hours without any indication that the molten material is degrading or becoming unstable. The melt viscosity of the coating composition after two hours of operation is 45,000 cp. at 190° C. Other items which are coated, some with and some without a supporting substrate, include whole dressed chickens, pieces of chicken, cheese, 1-lb. packages of bacon, screw drivers, door closers, baby bottle nipples, pencils, nuts and bolts, electrical components, transistor batteries, and pliers.

Films 7.5 mils thick are prepared from the above coating composition and have the following properties:

Tensile break strength (ASTM D882-61) p.s.i. ____ 870
Elongation (ASTM D882-61) percent _____ 614
Gloss (ASTM C3465-51) percent _____ 60
Timed dart impact at −40° C. (ASTM D758-48) g. _____ 292

EXAMPLE 3

A blend having a melt viscosity at 190° C. of 29,000 cp. is prepared comprising 80 percent by weight of an ethylene/vinyl acetate copolymer and a low viscosity polypropylene. The copolymer contains 82 percent by weight ethylene and 18 percent bp weight vinyl acetate and has a melt viscosity at 190° C. of 58,000 cp. The polypropylene has a melt viscosity at 190° C. of 3,000 cp. This blend is stabilized with 0.1 percent DLTDP, 0.05 percent BHT, and 0.3 percent Polygard. It is employed in a curtain coating process as described in Example 2 and performs very well. Air-quenched films, 5 mils thick, have the following properties:

Tensile modulus, p.s.i. _____ 7,700
Tensile yield strength, p.s.i. _____ 570
Tensile break strength, p.s.i. _____ 570
Elongation percent _____ 58
Appearance—clear with slight haze.

EXAMPLES 4–19

Blends of various proportions of copolymer compositions and polyolefins are prepared and employed in curtain coating operations as described in the preceding examples. In each instance the coatings are excellent. The blend proportions and properties are given in the following tabulation.

| | Copolymer | | Polyolefin | | | |
|---|---|---|---|---|---|---|
| Example | Wt. percent | Comonomer proportions, wt. percent | Wt. percent | Type | Melt viscosity at 190° C. cp. | Melt viscosity of blend at 190° C. cp. |
| 4 | 80 | 72 ethylene, 28 vinyl acetate | 20 | Polyethylene | 3,800 | 42,000 |
| 5 | 80 | 95 ethylene, 5 vinyl acetate | 20 | do | 4,000 | 40,000 |
| 6 | 90 | 82 ethylene, 18 vinyl acetate | 10 | do | 4,000 | 50,000 |
| 7 | 85 | 85 ethylene, 15 ethyl acrylate | 15 | do | 4,000 | 45,000 |
| 8 | 80 | 88 ethylene, 12 ethyl acrylate | 20 | Polypropylene | 75,000 | 60,000 |
| 9 | 50 | 82 ethylene, 18 vinyl acetate | 50 | do | 140,000 | 95,000 |
| 10 | 95 | 90 ethylene, 10 isopropenyl acetate | 5 | Poly(1-butene) | 86,000 | 28,000 |
| 11 | 80 | 85 ethylene, 15 isobutyl acrylate | 20 | Copolymer: 60 propylene, 40 1-butene | 80,000 | 35,000 |
| 12 | 80 | 89 ethylene, 11 2-ethylhexyl acrylate | 20 | Polypropylene | 60,000 | 50,000 |
| 13 | 80 | 92 ethylene, 8 acrylic acid | 20 | Polyethylene | 10,000 | 40,000 |
| 14 | 98 | 85 ethylene, 15 methyl methacrylate | 2 | Polypropylene | 100,000 | 24,000 |
| 15 | 98 | 85 ethylene, 15 methyl methacrylate | 2 | do | 400,000 | 24,000 |
| 16 | 80 | 82 ethylene, 18 vinyl acetate | 20 | Copolymer: 97 propylene, 3 ethylene | 30,000 | 35,000 |
| 17 | 80 | do | 20 | Copolymer: 98 1-butene, 2 ethylene | 30,000 | 40,000 |
| 18 | 85 | do | 15 | Polypropylene | 380,000 | 82,000 |
| 19 | 80 | 90 ethylene, 10 methacrylic acid | 20 | do | 40,000 | 20,000 |
| 20 | 80 | 55 ethylene, 45 vinyl acetate | 20 | Polyethylene | 4,000 | 41,000 |

Although the invention has been described in considerable detail with reference to certain preferred embodiments thereof, it will be understood that variations and modifications can be effected within the spirit and scope of the invention as described hereinabove and as defined in the appended claims.

What is claimed is:

1. In a process for coating articles by (a) forming a falling curtain of a viscous, molten, thermoplastic composition, (b) causing an article to be passed through said curtain so as to deposit the curtain over the upwardly facing surfaces of said article, and (c) permitting the curtain to congeal in place; the improvement which comprises employing as the said thermoplastic composition a resinous material having a high degree of melt stability, having a melt viscosity at 190° C. of 5,000 to 125,000 cp. and consisting essentially of:
   (1) 80 to 95 percent by weight of a copolymer of 70 to 85 percent by weight of ethylene and 15 to 30 percent of at least one comonomer selected from the group consisting of:
      (a) alkenyl alkanoates wherein said alkenyl portion contains 2–4 carbon atoms and said alkanoates portion contains 2 to 6 carbon atoms,
      (b) alkyl acrylates wherein said alkyl contains 1 to 8 carbon atoms,
      (c) alkyl methacrylates wherein said alkyl contains 1 to 8 carbon atoms,
      (d) acrylic acid, and
      (e) methacrylic acid, and
   (2) 5 to 20 percent by weight of a crystallizable polymer of an α-olefin having 2 to 10 carbon atoms, said polymer having a melt viscosity at 190° C. of 1,000 to 20,000 cp. when polyethylene is used and 1,000 to 400,000 cp. when a polymer or copolymer of propylene or higher α-olefin is used, and said thermoplastic composition is stable in the molten form for a period of at least 2 hours.

2. The process of claim 1, wherein the article is supported on a paper, cardboard or paperboard substrate before the article is passed through said curtain.

3. The process of claim 2, wherein vacuum is applied beneath said substrate to facilitate depositing the curtain.

(References on following page)

References Cited

UNITED STATES PATENTS

| | | |
|---|---|---|
| 2,047,544 | 7/1936 | Bruce. |
| 2,712,503 | 7/1955 | Dyekjaer _____ 99—169 X |
| 2,931,495 | 4/1960 | Stratton. |
| 2,953,541 | 9/1960 | Pecha et al. |
| 2,989,827 | 6/1961 | Groth. |
| 3,067,060 | 12/1962 | Glaus _____ 117—120 X |
| 3,201,498 | 8/1965 | Brunson et al. |
| 3,217,830 | 11/1965 | Hoelzer _____ 156—285 X |
| 3,248,232 | 4/1966 | Krajewski _____ 99—169 X |
| 3,389,016 | 6/1968 | Holtz et al. _____ 117—161 X |
| 3,341,354 | 9/1967 | Woods et al. _____ 117—105.3 |

WILLIAM D. MARTIN, Primary Examiner

H. J. GWINNELL, Assistant Examiner

U.S. Cl. X.R.

99—168, 169; 117—119, 155, 161; 206—80